Figure 1:
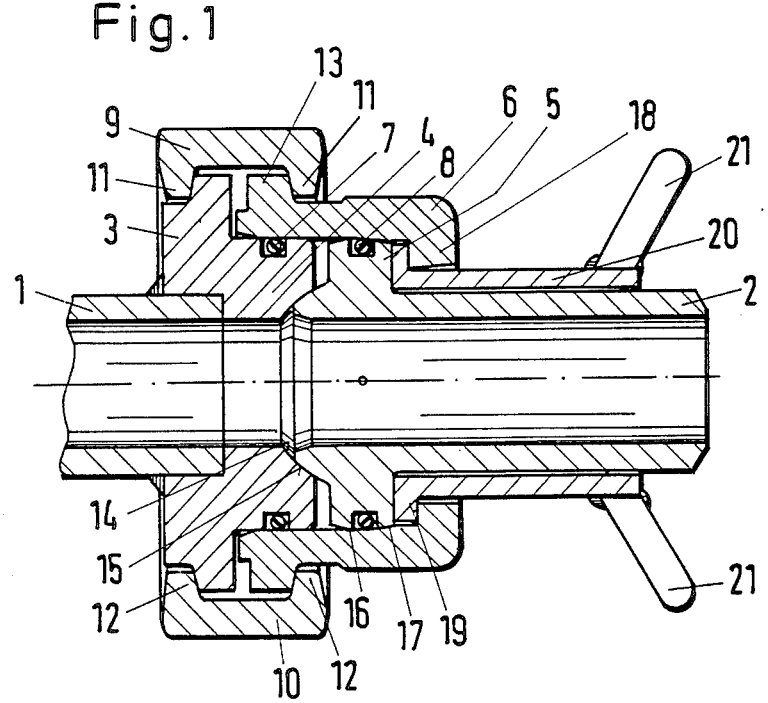

United States Patent [19]

Weinhold

[11] Patent Number: 4,747,622
[45] Date of Patent: May 31, 1988

[54] PIPE CONNECTION

[76] Inventor: Karl Weinhold, im Jagdfeld 43, 4040 Neuss, Fed. Rep. of Germany

[21] Appl. No.: 5,826

[22] Filed: Jan. 21, 1987

[30] Foreign Application Priority Data

Jan. 23, 1986 [DE] Fed. Rep. of Germany ....... 3601895

[51] Int. Cl.⁴ .............................................. F16L 37/00
[52] U.S. Cl. ...................................... 285/38; 285/184
[58] Field of Search ................................... 285/38, 184

[56] References Cited

U.S. PATENT DOCUMENTS

| 61,626 | 1/1867 | Matthews | 285/38 |
| 1,077,943 | 11/1913 | Schmelzer | 285/38 |
| 4,082,320 | 4/1978 | Weinhold | 285/31 |
| 4,252,347 | 2/1981 | Weinhold | 285/38 |

FOREIGN PATENT DOCUMENTS

| 2249600 | 7/1975 | Fed. Rep. of Germany . |
| 2548978 | 5/1977 | Fed. Rep. of Germany . |
| 2804017 | 3/1980 | Fed. Rep. of Germany . |
| 1525797 | 9/1978 | United Kingdom . |

Primary Examiner—Dave W. Arola
Attorney, Agent, or Firm—Kerkam, Stowell, Kondracki & Clarke

[57] ABSTRACT

The angular relation of a pair of pipes to be connected can be changed then fixed in the required angular position. The angular position of the fixed pipe axis cannot be changed without intentional rotation of wedge-shaped parts of the assembly.

4 Claims, 1 Drawing Sheet

U.S. Patent May 31, 1988 4,747,622

PIPE CONNECTION

The invention relates to a pipe connection for the connection of two pipe ends, each provided with a collar, one of which ends is a socket part surrounding the pipe end assigned to it and sealed off with respect to it by a ring gasket, which socket part surrounds a plug part joined to the other pipe end and is sealed off with respect to its outer wall by means of a further ring gasket, the socket part being displaceable in an axial direction with respect to the pipe end assigned to it and securing the part of the pipe end engaging in the socket part against coming out by means of a shoulder, with, in each case, an outer collar on the socket part and on the plug part and with a quick closure which has detachably interconnected shell sections part with the flanges behind both collars when the pipe connection is closed, and with which a ring part is inserted between the collar at one end and the radially inward-directed shoulder on the socket part, which ring part has a wedge-shaped tapered face at at least one end.

A pipe connection with a collar on each of the opposing pipe ends is known from German Offenlegungsschrift No. 2,548,978. One of the pipe ends has a plug part and in the case of the other a socket part is pushed over the collar and engages behind the collar with a stop shoulder. On the one collar and on the socket part there are stop shoulders, behind which a pipe coupling clip engages. The socket part is sealed off with respect to both collars by a ring gasket in each case. The collar overlapped by the socket part has a domed circumferential surface and the socket part has a correspondingly cup-shaped bearing surface. This makes it possible for the one pipe piece to be angled relative to the other once the pipe coupling clip has been closed. However, the angular position set cannot be fixed, the pipes can constantly change their angular position with respect to each other.

A similar design is shown by German Auslegeschrift No. 2,804,017. In the case of the latter known design, however, the angular position of the two pipes with respect to each other can be fixed by means of a wedge-shaped ring part.

Nevertheless, the adjustment of the angular position of the pipes with respect to each other, just as in the design according to German Patent Specification No. 2,249,600, is only possible before closing of the pipe coupling clip. This means that the angular position to be set between the axes of the pipes to be connected to each other must be known before closing of the pipe coupling clip, because the angular position can no longer be changed after the clip has been closed. This is so since the pipe coupling clip fixes the wedge-shaped ring part and no longer permits it to be turned after its closure.

However, in many cases, the angular position of the axes of the pipes to be connected to each other is not known exactly when closing the pipe coupling clip or else cannot be determined precisely. In some cases it only becomes apparent when the following pipe piece has been connected. There is also a need to be able to change the angular position of the pipe axes subsequently without opening the closed pipe coupling clip, for example if the pipeline has to be laid a little differently.

Consequently, it is the object which the invention is to achieve to create means by which it is possible in a simple way to adjust or readjust the angular position of pipe pieces connected to each other by a pipe coupling clip in the flange region and then to fix the angular position set without having to release the flange connection.

The pipe connection according to the invention achieves the object set since the angular position of the pipes connected to each other can be changed and fixed in the position, set after the pipe coupling clip has been closed, by turning the pipe piece with moulded-on or attached wedge-shaped ring part. The angular position of the pipe axes cannot be changed without intentional turning of the pipe piece with wedge-shaped ring part. This ensures that the angular position of the pipe axes is not unintentionally altered as in the case of the known design according to German Offenlegungsschrift No. 2,532,831 by displacing one of the pipes or both pipes transversely to the axis.

In addition, the solution found is simple in design and involves little expense. Troublesome manipulation is also dispensed with, which is an advantage not to be underestimated in the case of difficultly accessible places or underground.

Figure 2:
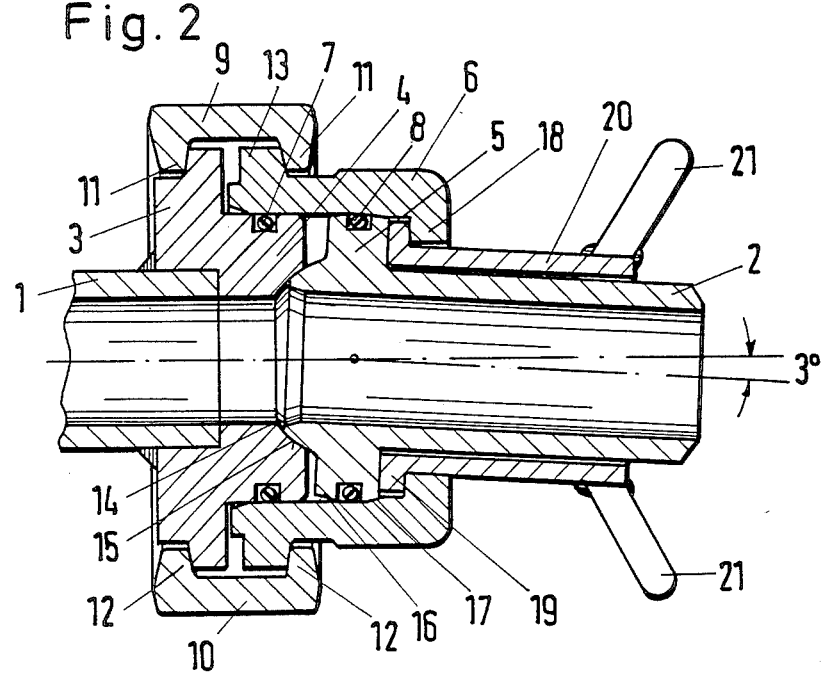

The invention is explained in more detail with reference to the exemplary embodiment represented in the drawing, in which FIG. 1 shows a longitudinal section of the pipe connection according to the invention with aligned pipe axes, and FIG. 2 shows a longitudinal section of the pipe connection with mutually angled off pipe axes.

The one pipe 1 of the pipes 1, 2 to be connected to each other is provided at the end with a collar 3, which has a plug part 4. The other pipe 2 likewise has at the end a collar 5, over which the socket part 6 is pushed to the extent that it overlaps the plug part 4. For sealing off of the gap with respect to the socket part 6, ring gaskets 7, 8 are inserted in grooves both in the plug part 4 and in the collar 5. Shell sections 9, 10, which are pivotably connected to each other on one side and can be closed on their other sides by means of a gripping lever connection (not shown), serve to keep the pipe connection together. The shell sections 9, 10 have radially inward-protruding flanges 11, 12 which engage around the collar 3 and a radial projection 13 on the socket part 6.

Provided on the plug part 4 is a spherical cup-shaped bearing surface 14, against which the collar 5 of the other pipe 2 lies with a correspondingly spherical segment-shaped counter-surface 15 when the pipe connection is closed.

In order that the pipe 2 can tilt within the socket part 6, the circumferential surface 16 of the collar 5 is of domed design and the socket part 6 has a correspondingly arched counter-surface 17.

Arranged between the collar 5 on the pipe 2 and the radially inward-directed shoulder 18 on the socket part 6 is a wedge-shaped ring part 19, which lies with its faces on the one hand against the rear face of the collar 5 and on the other hand against the likewise wedge-shape inner surface of the shoulder 18 on the socket part 6. Moulded onto the ring part 19 is a pipe piece 20, which extends through and outwards between pipe 2, running coaxially to it, and the shoulder 18. Using the handles 21, the pipe piece 20, and with it the moulded-on wedge-shaped ring part 19, can be turned even when the pipe connection is closed. When the pipe piece 20 is turned, the wedge-shaped tapered face of the ring part 19 slides on the correspondingly tapered face of the shoulder 18. While the axes of the pipes 1, 2 align in the position according to FIG. 1, after a turning of the pipe piece 20 through 180°, the angling of the axis of the pipe 2 relative to that of the pipe 1 is produced, in this case about 3°. Further turning of the pipe piece 20 by means of the handles 21 by a further 180° brings about a return to the position of FIG. 1. During turning of the pipe piece 20 through 360°, the axis of the pipe 2 describes a cone with the acute angle 3+3=6°.

The degree of angular displacement of the axes of the pipes 1, 2 depends on the taper of the wedge surfaces. It is also possible here to taper the face of the collar 5 opposite the ring part 19, in addition to or alternatively to the tapering of the contact surface of the ring part 19 on the shoulder 18, as is indicated by dot-dashed lines in FIG. 2.

I claim:

1. A pipe Connection for connecting two pipe ends, collars fixed at each pipe end, a plug part joined to one end of one of the collars, a socket part surrounding the collar and the plug part, ring gaskets between and sealingly engaging the socket part and one collar and the socket part and the plug part, an inwardly directed shoulder at one end of the socket part and on outwardly directed shoulder at the other end of the socket part, a pair of pivotally connected shell sections which when closed engage at one end said collar at one pipe end and the outwardly directed shoulder on the socket part at the other end thereby functioning to keep the pipe connection together, a pipe piece having attached at one end a ring part, said ring part having a wedge-shaped tapered face, a complementary wedge-shaped taper on the face of the inwardly directed shoulder of the socket part, said pipe piece and ring part fitted under the socket part axial outwardly of the pipe collar at that end of the pipe, handles provided on the pipe piece at the opposite end from the ring part, whereby upon turning the pipe piece on the pipe the cooperating wedge-shaped tapers on the ring part and the inwardly directed shoulder permit off angle connection of the pipe ends.

2. A pipe connection according to claim 1, further characterized in that the plug part (4) is provided with a spherical cup-shaped bearing surface (14) and at the opposite end of the pipe there is a spherical segment-shaped counter-surface (15).

3. A pipe connection according to claim 1, further characterized in that the collar (5) has a domed circumferential surface (16) and the socket part (6) has correspondingly adapted counter surface (17).

4. A Pipe connection according to claim 2, further characterized in that the collar (5) has a domed circumferential surface (16) and the socket part (6) has a correspondingly adapted counter surface (17).

* * * * *